United States Patent
Doucet, III (10) Patent No.: US 12,357,130 B1
(45) Date of Patent: Jul. 15, 2025

(54) NESTABLE COOKWARE WITH DETACHABLE HANDLE

(71) Applicant: Wilfred J Doucet, III, Ragley, LA (US)

(72) Inventor: Wilfred J Doucet, III, Ragley, LA (US)

(*) Notice: Subject to any disclaimer, the term of this patent is extended or adjusted under 35 U.S.C. 154(b) by 129 days.

(21) Appl. No.: 18/239,170

(22) Filed: Aug. 29, 2023

(51) Int. Cl.
| | |
|---|---|
| A47J 45/07 | (2006.01) |
| A47J 36/06 | (2006.01) |
| A47J 36/08 | (2006.01) |
| H01F 7/02 | (2006.01) |

(52) U.S. Cl.
CPC ........... *A47J 45/071* (2013.01); *A47J 36/064* (2022.01); *A47J 36/08* (2013.01); *H01F 7/02* (2013.01)

(58) Field of Classification Search
CPC ......... A47J 45/071; A47J 45/07; A47J 45/072
USPC ......................................................... 220/759
See application file for complete search history.

(56) References Cited

U.S. PATENT DOCUMENTS

| | | | | |
|---|---|---|---|---|
| 2,798,247 | A * | 7/1957 | Sladky | A47J 45/071 |
| | | | | 403/258 |
| 4,083,081 | A * | 4/1978 | Witte | A47J 45/071 |
| | | | | 220/759 |
| 5,887,751 | A | 3/1999 | Kroscher | |
| D734,983 | S | 7/2015 | Doyle | |
| 2007/0181590 | A1 * | 8/2007 | Emparanza Knorr . | A61H 7/006 |
| | | | | 220/759 |
| 2009/0049650 | A1 * | 2/2009 | Cuillery | A47J 45/061 |
| | | | | 16/425 |
| 2012/0168455 | A1 | 7/2012 | Doyle | |
| 2018/0020865 | A1 | 1/2018 | Oh | |
| 2018/0296041 | A1 | 10/2018 | Oh | |
| 2020/0245819 | A1 | 8/2020 | Besche | |
| 2021/0030210 | A1 * | 2/2021 | Pothakamuri ........ | A47J 45/061 |
| 2021/0321828 | A1 * | 10/2021 | Stevenson ............. | A47J 45/071 |
| 2022/0095845 | A1 | 3/2022 | Chan | |
| 2023/0233031 | A1 * | 7/2023 | Giatti ..................... | A47J 45/071 |
| | | | | 16/110.1 |

FOREIGN PATENT DOCUMENTS

WO       2021211737       10/2021

* cited by examiner

*Primary Examiner* — Stephen J Castellano (57) ABSTRACT

The nestable cookware with detachable handle is a kit. The nestable cookware with detachable handle is cookware. The nestable cookware with detachable handle incorporates a plurality of cooking pans, an accessory kit, and a handle structure. The plurality of cooking pans are nestable structures. The plurality of cooking pans includes a collection of individual pan structures. The accessory kit contains cooking accessories that are stored within the plurality of cooking pans. The handle structure forms a grip that detachably attaches to any individual pan structure selected from the plurality of cooking pans.

9 Claims, 6 Drawing Sheets

NESTABLE COOKWARE WITH DETACHABLE HANDLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of detachable handles for hollow-ware articles. (A47J45/07)

SUMMARY OF INVENTION

The nestable cookware with detachable handle is a kit. The nestable cookware with detachable handle is cookware. The nestable cookware with detachable handle comprises a plurality of cooking pans, an accessory kit, and a handle structure. The plurality of cooking pans 101 are nestable structures. The plurality of cooking pans comprises a collection of individual pan structures. The accessory kit contains cooking accessories that are stored within the plurality of cooking pans. The handle structure forms a grip that detachably attaches to any individual pan structure selected from the plurality of cooking pans.

These together with additional objects, features and advantages of the nestable cookware with detachable handle will be readily apparent to those of ordinary skill in the art upon reading the following detailed description of the presently preferred, but nonetheless illustrative, embodiments when taken in conjunction with the accompanying drawings.

In this respect, before explaining the current embodiments of the nestable cookware with detachable handle in detail, it is to be understood that the nestable cookware with detachable handle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the nestable cookware with detachable handle.

It is therefore important that the claims be regarded as including such equivalent construction insofar as they do not depart from the spirit and scope of the nestable cookware with detachable handle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
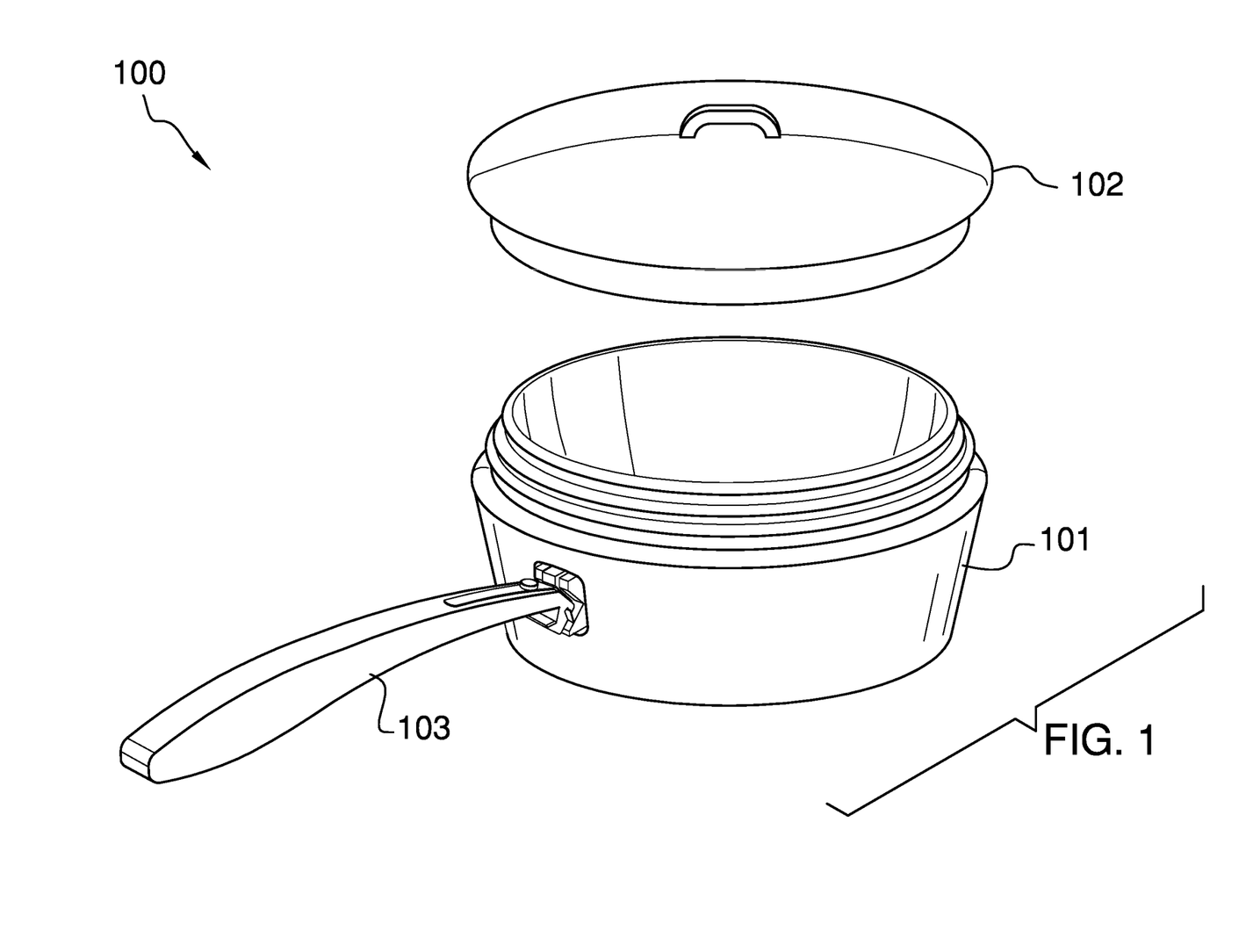
FIG. 1 is a perspective view of an embodiment of the disclosure.
Figure 2:
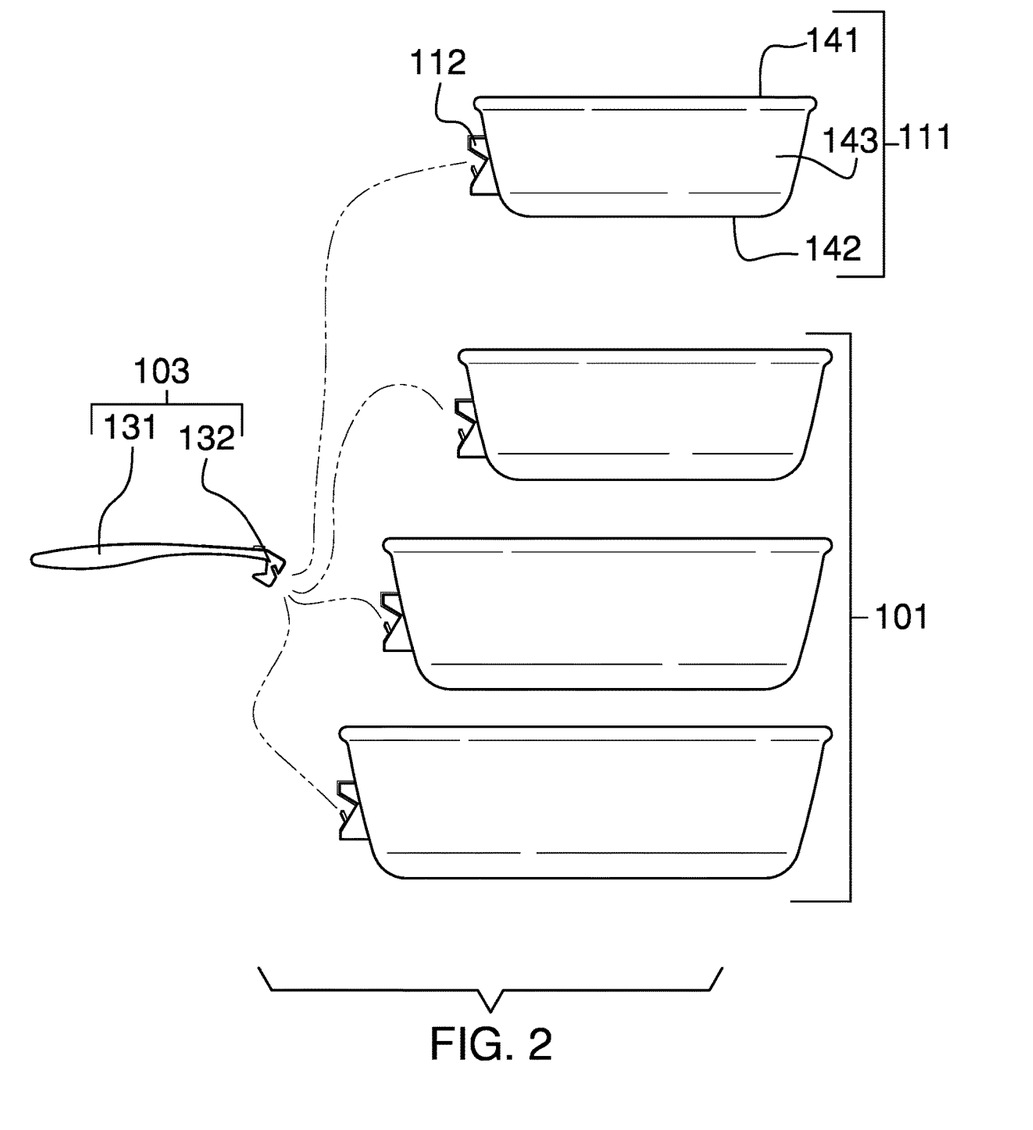
FIG. 2 is an exploded view of an embodiment of the disclosure.
Figure 3:
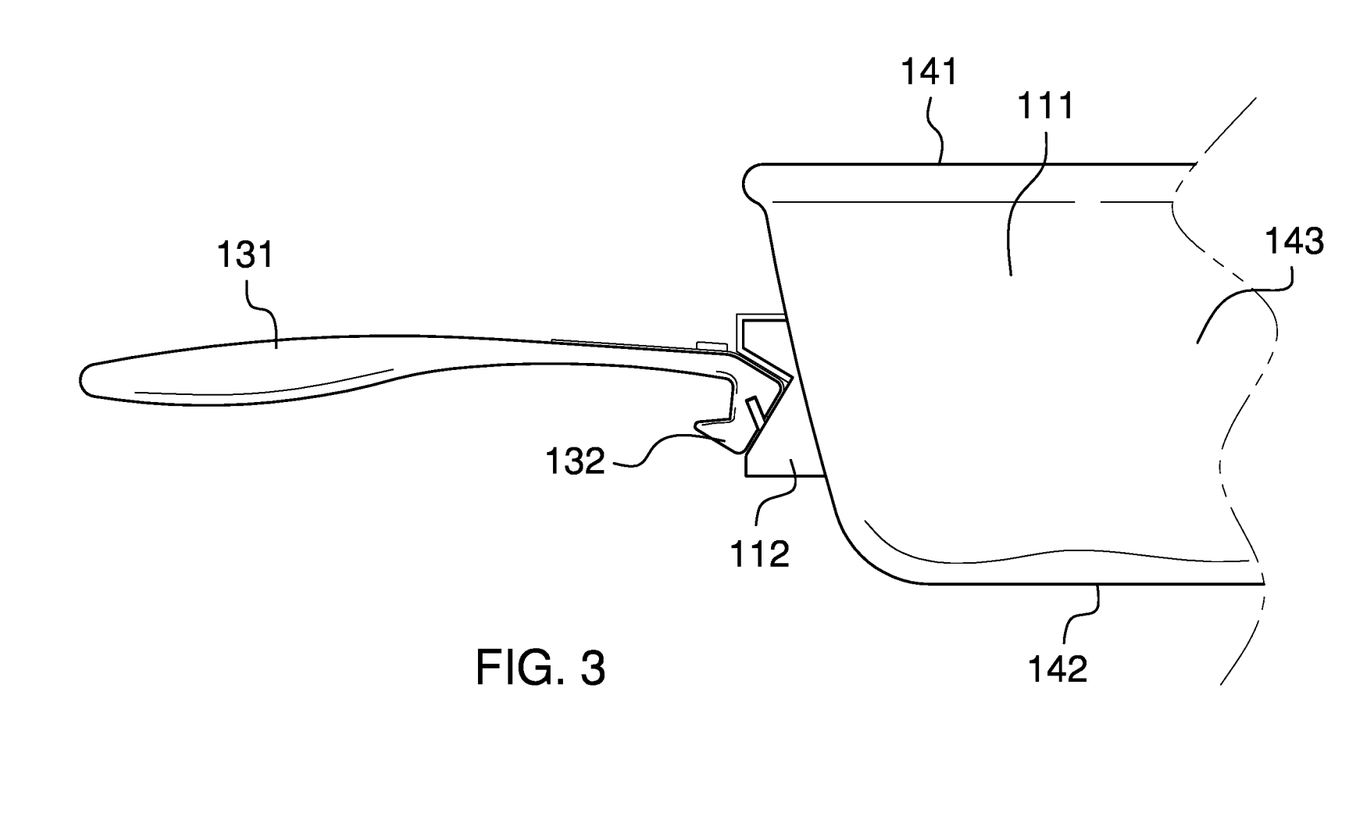
FIG. 3 is a side view of an embodiment of the disclosure.
Figure 4:
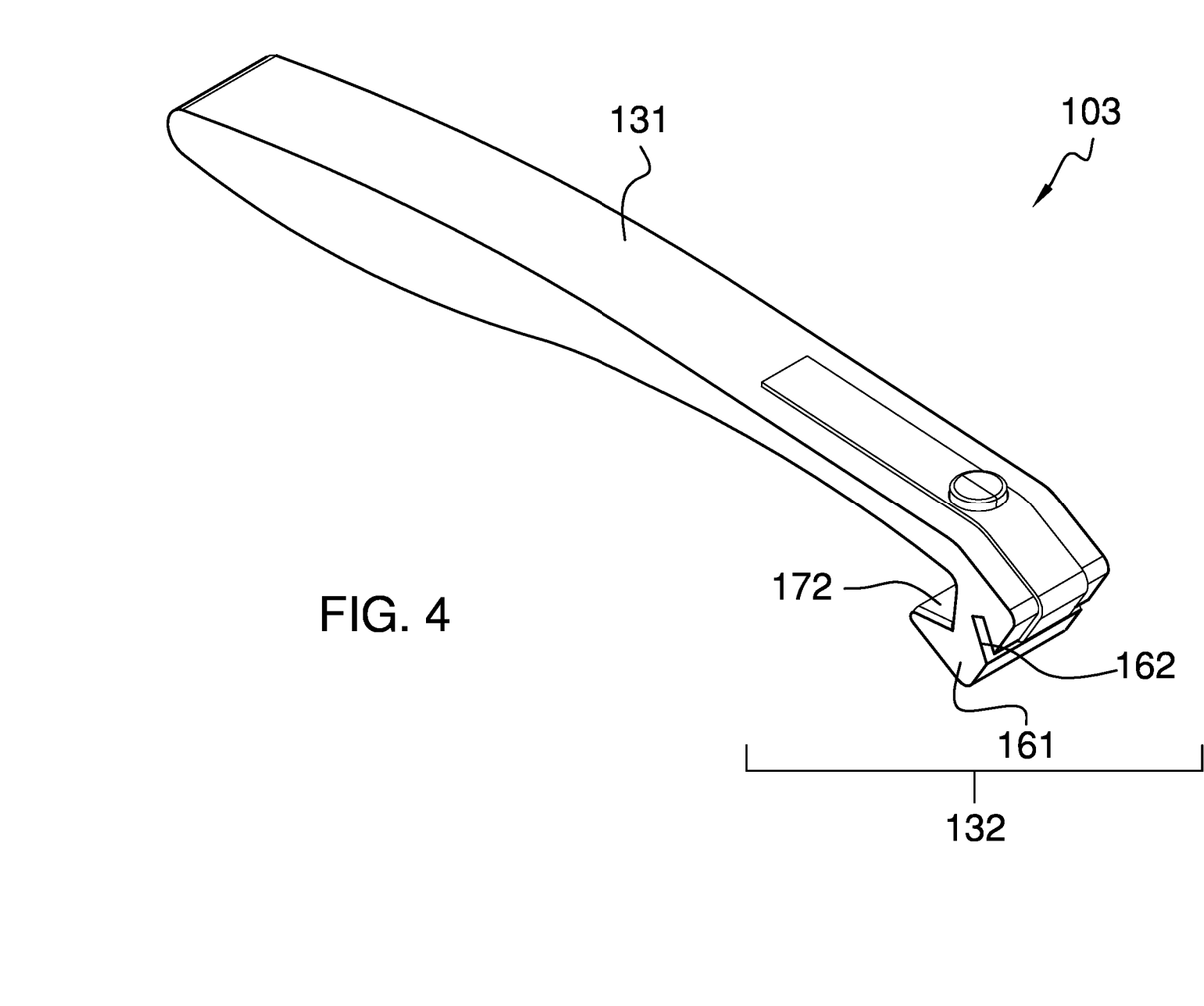
FIG. 4 is a detail view of an embodiment of the disclosure.
Figure 5:
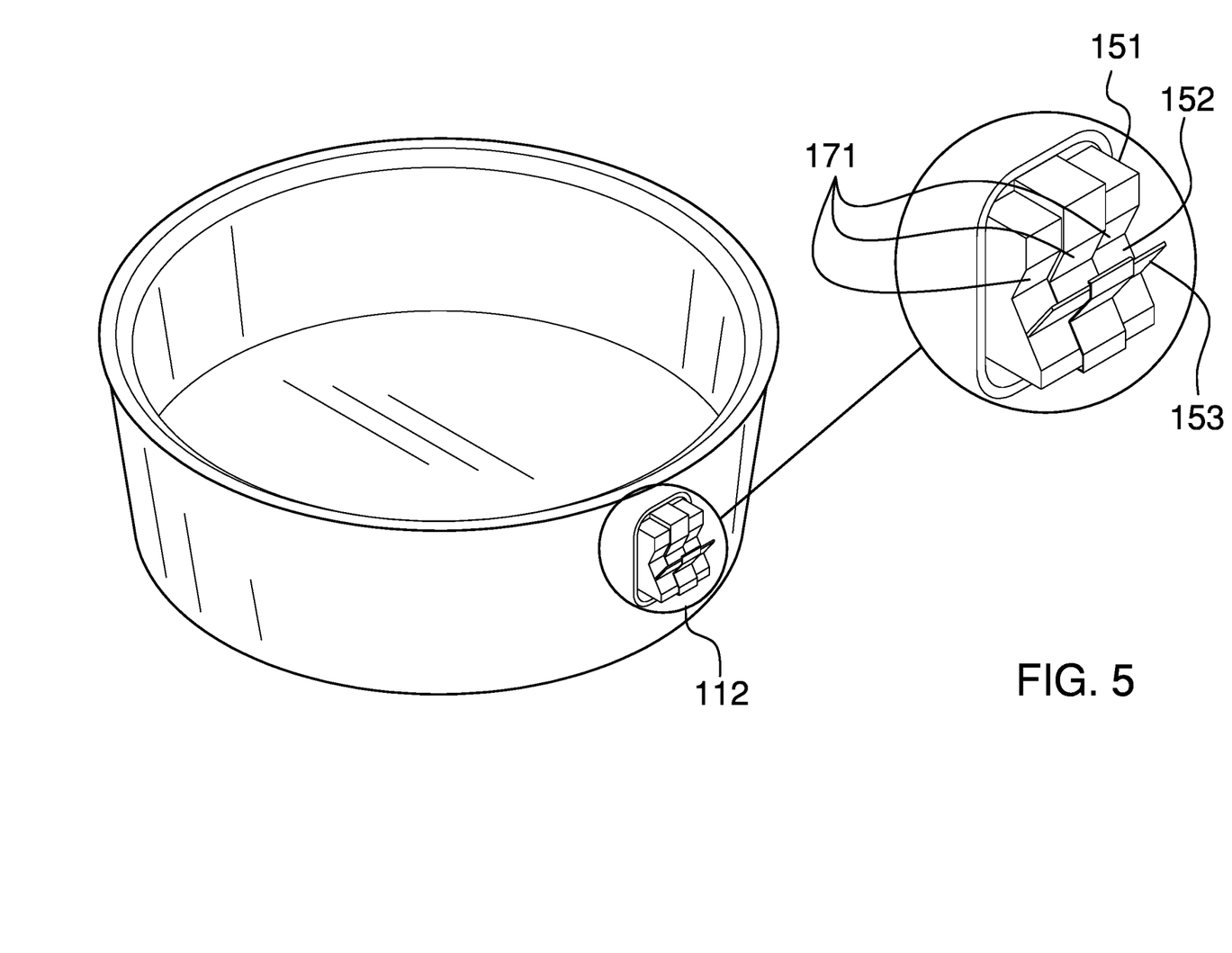
FIG. 5 is a detail view of an embodiment of the disclosure.
Figure 6:
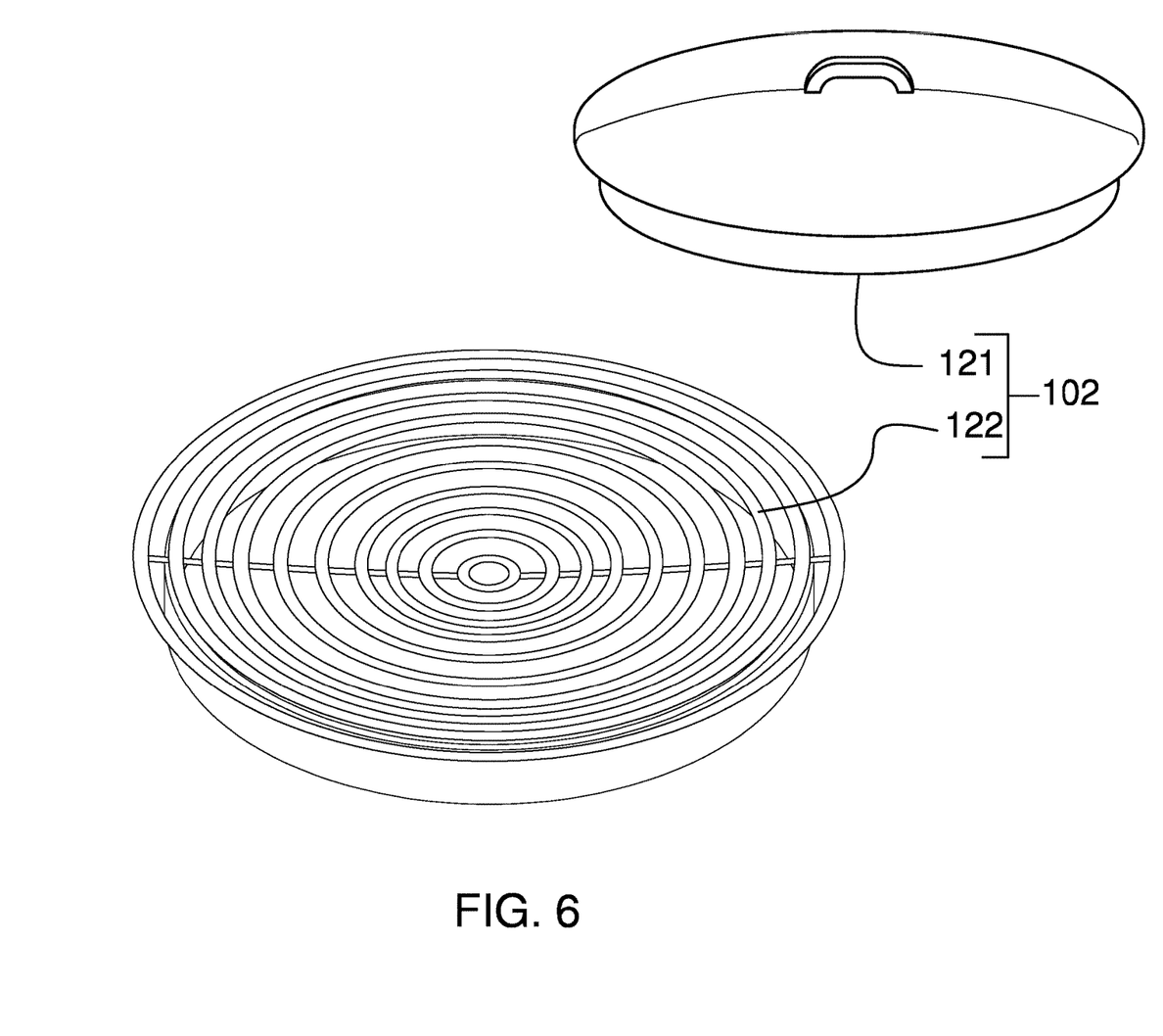
FIG. 6 is a detail view of an embodiment of the disclosure.

Detailed reference will now be made to one or more potential embodiments of the disclosure, which are illustrated in FIGS. 1 through 6.

The nestable cookware with detachable handle 100 (hereinafter invention) is a kit. The invention 100 is cookware. The invention 100 comprises a plurality of cooking pans 101, an accessory kit 102, and a handle structure 103. The plurality of cooking pans 101 are nestable structures. The plurality of cooking pans 101 comprises a collection of individual pan structures 111. The accessory kit 102 contains cooking accessories that are stored within the plurality of cooking pans 101. The handle structure 103 forms a grip that detachably attaches to any individual pan structure 111 selected from the plurality of cooking pans 101.

The plurality of cooking pans 101 form the containment structures of the invention 100. The plurality of cooking pans forms a nestable structure. The plurality of cooking pans 101 forms a collapsible structure that minimizes the perimetrical boundary of the invention 100. The plurality of cooking pans 101 comprises a collection of individual pan structures 111.

Each individual pan structure 111 selected from the plurality of cooking pans 101 forms a container that receives foodstuffs during the cooking process. Each selected individual pan structure 111 is a conductive structure that transfers externally generated heat into the food stuff. Each selected individual pan structure 111 is a prism shaped structure. Each selected individual pan structure 111 has a tapered prism shape. Each selected individual pan structure 111 has a pan shape.

The individual pan structures 111 contained in the plurality of cooking pans 101 are geometrically similar. The individual pan structures 111 contained in the plurality of cooking pans 101 are nestable. The plurality of cooking pans 101 are formed such that the span of the length of the outer diameter of the prism structure any individual pan structure 111 initially selected from the plurality of cooking pans 101 differs from the span of the length of the outer diameter of any individual pan structure 111 subsequently selected from the plurality of cooking pans 101. The plurality of cooking pans 101 are further formed such that the span of the length of the inner diameter of the prism structure any individual pan structure 111 initially selected from the plurality of cooking pans 101 differs from the span of the length of the inner diameter of any individual pan structure 111 subsequently selected from the plurality of cooking pans 101.

Each individual pan structure 111 selected from the plurality of cooking pans 101 comprises an open face 141, a closed face 142, a lateral face 143, and a handle bracket 112. The open face 141 is the open face 141 of the pan shape of each individual pan structure 111 selected from the plurality of cooking pans 101. The closed face 142 is the closed face 142 of the pan shape of each individual pan structure 111 selected from the plurality of cooking pans 101. The closed face 142 is the face of the pan shape of each selected individual pan structure 111 that is distal from the open face 141. The lateral face 143 forms the lateral face 143 of the prism shape that forms the pan structure of each selected individual pan structure 111.

The handle bracket 112 mounts on the lateral face 143. The handle bracket 112 is a bracket. The handle bracket 112 permanently attaches to the lateral face 143 of the individual pan structure 111 that the handle bracket 112 attaches to. The handle bracket 112 forms an anchor point that receives the handle structure 103. The handle bracket 112 further comprises a non-Euclidean disk structure 151 and a handle notch 152.

The non-Euclidean disk structure 151 is a disk shaped structure. The non-Euclidean disk structure 151 forms the structure of the handle bracket 112 that secures the handle bracket 112 to the lateral face 143 of any individual pan structure 111 selected from the plurality of cooking pans 101. The non-Euclidean disk structure 151 is formed with a curvature that fits flush against the lateral face 143 of the selected individual pan structure 111. The non-Euclidean disk structure 151 forms the anchor to which the handle structure 103 attaches.

The handle notch 152 is a negative space that is formed in the exterior surface of the non-Euclidean disk structure 151. The handle notch 152 is geometrically similar to the handle structure 103. The handle structure 103 inserts into the handle notch 152 with a flush fit. The handle structure 103 removably attaches to the individual pan structure 111 through the handle notch 152. The handle notch 152 further comprises a tongue structure 153 and a first magnet 171.

The tongue structure 153 is a disk shaped structure. The tongue structure 153 attaches to the handle notch 152 such that the congruent ends of the disk structure of the tongue structure 153 project away from the handle notch 152 towards the handle structure 103. The tongue structure 153 forms the tongue of the tongue and groove system used to secure the handle structure 103 to the plurality of cooking pans 101.

The first magnet 171 is a magnet that mounts in the handle notch 152 of the non-Euclidean disk structure 151 of the handle bracket 112. The first magnet 171 forms a portion of the magnetic structure that aligns the tongue and groove structure that secures the handle structure 103 to any individual pan structure 111 selected from the plurality of cooking pans 101.

The handle structure 103 is a grip used to carry and manipulate an individual pan structure 111. The handle structure 103 detachably attaches to each individual pan structure 111 selected from the plurality of cooking pans 101. The handle structure 103 comprises a grip structure 131 and a working element 132. The working element 132 mounts on the grip structure 131.

The grip structure 131 forms the grip that is used to carry the invention 100. The grip structure 131 is a roughly prism shaped structure.

The working element 132 is a fastening device. The working element 132 attaches to a congruent end of the prism structure of the grip structure 131. The working element 132 fastens the handle structure 103 to any individual pan structure 111 selected from the plurality of cooking pans 101. The working element 132 removably attaches the grip structure 131 to the handle bracket 112 mounted on the selected individual pan structure 111. The invention 100 uses a tongue and groove system to secure the working element 132 to the handle bracket 112. The invention 100 uses a plurality of magnets to properly align the working element 132 with the handle bracket 112. The working element 132 further comprises a mounting structure 161, a groove structure 162, and a second magnet 172.

The mounting structure 161 is a mechanical structure. The mounting structure 161 mounts on a congruent end of the grip structure 131. The mounting structure 161 inserts into the handle notch 152 of the handle bracket 112 with a flush fit. The mounting structure 161 applies a latch structure to the tongue and groove system that secures the handle structure 103 to the plurality of cooking pans 101. The latch structure of the mounting structure 161 releases the tongue and groove system such that the handle structure 103 can be reattached to a different individual pan structure 111 selected from the plurality of cooking pans 101.

The groove structure 162 is a negative space that is formed into the mechanical structure formed by the mounting structure 161. The groove structure 162 is geometrically similar to the tongue structure 153 of the handle notch 152. The tongue structure 153 inserts into the groove structure 162 with a tight fit. The tongue structure 153 inserts into the groove structure 162 to form the tongue and groove system.

The second magnet 172 is a magnet that mounts in the mounting structure 161 of the grip structure 131. The second magnet 172 forms a portion of the magnetic structure that aligns the tongue and groove structure that secures the handle structure 103 to any individual pan structure 111 selected from the plurality of cooking pans 101. The second magnet 172 is magnetically attracted to the first magnet 171.

The first magnet 171 and the second magnet 172 are mounted on the handle notch 152 and the mounting structure 161 respectively such that the first magnet 171 and the second magnet 172 hold the tongue structure 153 and the groove structure 162 in a proper alignment when the handle structure 103 attaches to the selected individual pan structure 111.

The accessory kit 102 comprises a collection of accessories that are used with the invention 100. The accessory kit 102 further comprises a lid 121 and a strainer 122. The lid 121 encloses the open face 141 of any individual pan structure 111 selected from the plurality of cooking pans 101. The strainer 122 encloses the open face 141 of any individual pan structure 111 selected from the plurality of cooking pans 101.

The lid 121 is a disk shaped structure. The lid 121 is geometrically similar to the open face of the prism structure of any individual pan structure 111 selected from the plurality of cooking pans 101. The lid 121 is a solid structure. The lid encloses the open face of the prism structure of any selected individual pan structure 111. The lid 121 forms an insulating structure that contains heat within the covered individual pan structure 111.

The strainer 122 is a disk shaped structure. The strainer 122 is geometrically similar to the open face of the prism structure of any individual pan structure 111 selected from the plurality of cooking pans 101. The strainer 122 is a mesh structure. The strainer 122 encloses the open face of the prism structure of any selected individual pan structure 111. The strainer 122 forms a filter that separates the food stuff contained within the selected individual pan structure 111 and any fluids that have accumulated within the selected individual pan structure 111.

The following definitions were used in this disclosure:

Accessory: As used in this disclosure, an accessory is a first object or first device that is configured for use with a second object or second device. The use of the accessory enhances the appearance or functionality of the second object or second device.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Barrier: As used in this disclosure, a barrier is a physical obstacle that forms a boundary between a first space and a second space. The barrier prevents the passage of an object between the first space and the second space.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Collapsible: As used in this disclosure, the terms collapsible refers to a structure that is configured such that the volume of the structure is adjustable. By volume is meant the volume of the perimetrical boundary that contains the structure.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Cook: As used in this disclosure, to cook is a verb that means to prepare one or more foodstuffs for consumption.

Cookware: As used in this disclosure, cookware refers to containers or tools used in the preparation of foodstuff. Within this definition, containers include, but are not limited to, items such as pots, pans, and bowls. Within this definition, tools include, but are not limited to, cutting boards, colanders, mixing tools, cutting tools, and measuring devices.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Filter: As used in this disclosure, a filter is a mechanical device that is used to separate solids that are suspended in a liquid or a gas. A strainer is type of coarse filter.

Fitted: As used in this disclosure, the term fitted refers to two geometrically similar structures wherein the smaller geometrically similar structure inserts into the larger geometrically similar structure.

Flush: As used in this disclosure, the term flush is used to describe the alignment of a first surface and a second surface to form a single structure selected from the group consisting of a Euclidean plane and a non-Euclidean plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Kit: As used in this disclosure, a kit is an assembly of a combination of instruments, equipment, or supplies that are dedicated or intended for use in a specific purpose. Depending on the context, a kit may further include the container within which the instruments, equipment, and supplies are stored.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field. A magnet is further defined with a north pole and a south pole. By aligning with an external magnetic field is meant that the north-south pole structure of a first magnet will align with the north south pole of a second magnet. The pole of any first magnet will attract the opposite pole of any second magnet (i.e. a north pole will attract a south pole).

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the of the perimetrical boundary of the structure. The major and minor axes intersect at the center of the perimetrical boundary of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

Nested Structure: As used in this disclosure, a nested structure refers to a plurality of geometrically similar objects wherein a smaller geometrically similar object can be contained or stored within a larger geometrically similar object. When used as a verb, to nest refers to the arrangement of a plurality of geometrically similar objects into a nested structure.

Non-Euclidean Disk: As used in this disclosure, a non-Euclidean structure is a disk-shaped structure wherein the congruent end (faces) of the disk structure lies on a non-Euclidean plane.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Notch: As used in this disclosure, a notch is: 1) an indentation or negative space formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Relaxed Shape: As used in this disclosure, a structure is considered to be in its relaxed state when no shear, strain, or torsional forces are being applied to the structure.

Roughly: As used in this disclosure, roughly refers to a comparison between two objects. Roughly means that the difference between one or more parameters of the two compared objects are not significantly different.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis. Always use taper.

Tight Fit: As used in this disclosure, a tight fit refers to the insertion of a first object into a second object such that there is not a lot of space between the first object and the second object. By not a lot of space is meant that friction occurs when the first object moves within the second object.

Tongue and Groove Joint: As used in this disclosure, a tongue and groove joint is a joint that is used to fasten a first plate or board to second plate or board. together. The groove portion of the tongue and groove joint is a groove that is formed in an edge of the first plate or board. The tongue portion of the tongue and groove joint is a ridge that is formed on the edge of the second plate or board. The tongue portion of the tongue and groove joint is sized and shaped such that the tongue portion of the tongue and groove joint can be inserted into the groove portion of the tongue and groove joint thus attaching the first plate or board to the second plate or board.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A nestable cookware kit with detachable handle comprising
    a plurality of cooking pans, an accessory kit, and a handle structure;
    wherein the accessory kit contains cooking accessories that are stored within the plurality of cooking pans;
    wherein the handle structure attaches to the plurality of cooking pans;
    wherein the plurality of cooking pans comprises a collection of individual pan structures;
    wherein each individual pan structure selected from the plurality of cooking pans comprises an open face, a closed face, a lateral face, and a handle bracket;
    wherein the handle bracket further comprises a non-Euclidean disk structure and a handle notch;
    wherein the non-Euclidean disk structure is a disk shaped structure;
    wherein the non-Euclidean disk structure forms the structure of the handle bracket that secures the handle bracket to the lateral face of any individual pan structure selected from the plurality of cooking pans;
    wherein the non-Euclidean disk structure is formed with a curvature that fits flush against the lateral face of the selected individual pan structure;
    wherein the non-Euclidean disk structure forms the anchor to which the handle structure attaches;
    wherein the handle notch is a negative space that is formed in the exterior surface of the non-Euclidean disk structure;
    wherein the handle notch is geometrically similar to the handle structure;
    wherein the handle structure inserts into the handle notch with a flush fit;
    wherein the handle structure removably attaches to the individual pan structure through the handle notch;
    wherein the handle notch further comprises a tongue structure and a first magnet;
    wherein the tongue structure is a disk shaped structure;
    wherein the tongue structure attaches to the handle notch such that the congruent ends of the disk structure of the tongue structure project away from the handle notch towards the handle structure;
    wherein the tongue structure forms the tongue of the tongue and groove system used to secure the handle structure to the plurality of cooking pans;
    wherein the first magnet is a magnet that mounts in the handle notch of the non-Euclidean disk structure of the handle bracket;
    wherein the first magnet forms a portion of the magnetic structure that aligns the tongue and groove structure that secures the handle structure to any individual pan structure selected from the plurality of cooking pans.

2. The nestable cookware kit with detachable handle according to claim 1
    wherein the nestable cookware kit with detachable handle is cookware;
    wherein the handle structure forms a grip that detachably attaches to any individual pan structure selected from the plurality of cooking pans;
    wherein the plurality of cooking pans forms a nestable structure;
    wherein the plurality of cooking pans forms a collapsible structure that minimizes the perimetrical boundary of the nestable cookware kit with detachable handle;
    wherein each individual pan structure selected from the plurality of cooking pans forms a container.

3. The nestable cookware kit with detachable handle according to claim 2
    wherein each selected individual pan structure is a prism shaped structure;
    wherein each selected individual pan structure has a tapered prism shape;
    wherein each selected individual pan structure has a pan shape;
    wherein the individual pan structures contained in the plurality of cooking pans are geometrically similar;
    wherein the plurality of cooking pans are formed such that the span of the length of the outer diameter of the prism structure any individual pan structure initially selected from the plurality of cooking pans differs from the span of the length of the outer diameter of any individual pan structure subsequently selected from the plurality of cooking pans;
    wherein the plurality of cooking pans are further formed such that the span of the length of the inner diameter of the prism structure any individual pan structure initially selected from the plurality of cooking pans differs from the span of the length of the inner diameter of any individual pan structure subsequently selected from the plurality of cooking pans.

4. The nestable cookware kit with detachable handle according to claim 3
wherein the handle structure is a grip used to carry and manipulate an individual pan structure;
wherein the handle structure detachably attaches to each individual pan structure selected from the plurality of cooking pans.

5. The nestable cookware kit with detachable handle according to claim 4
wherein the open face is the open face of the pan shape of each individual pan structure selected from the plurality of cooking pans;
wherein the closed face is the closed face of the pan shape of each individual pan structure selected from the plurality of cooking pans;
wherein the closed face is the face of the pan shape of each selected individual pan structure that is distal from the open face;
wherein the lateral face forms the lateral face of the prism shape that forms the pan structure of each selected individual pan structure;
wherein the handle bracket mounts on the lateral face.

6. The nestable cookware kit with detachable handle according to claim 5
wherein the handle bracket is a bracket;
wherein the handle bracket permanently attaches to the lateral face of the individual pan structure that the handle bracket attaches to;
wherein the handle bracket forms an anchor point that receives the handle structure.

7. The nestable cookware kit with detachable handle according to claim 6
wherein the handle structure comprises a grip structure and a working element;
wherein the working element mounts on the grip structure;
wherein the grip structure forms the grip that is used to carry the nestable cookware kit with detachable handle;
wherein the grip structure is a roughly prism shaped structure;
wherein the working element is a fastening device;
wherein the working element attaches to a congruent end of the prism structure of the grip structure;
wherein the working element fastens the handle structure to any individual pan structure selected from the plurality of cooking pans;
wherein the working element removably attaches the grip structure to the handle bracket mounted on the selected individual pan structure.

8. The nestable cookware kit with detachable handle according to claim 7
wherein the working element further comprises a mounting structure, a groove structure, and a second magnet;
wherein the mounting structure is a mechanical structure;
wherein the mounting structure mounts on a congruent end of the grip structure;
wherein the mounting structure inserts into the handle notch of the handle bracket with a flush fit;
wherein the mounting structure applies a latch structure to the tongue and groove system that secures the handle structure to the plurality of cooking pans;
wherein the latch structure of the mounting structure releases the tongue and groove system such that the handle structure can be reattached to a different individual pan structure selected from the plurality of cooking pans;
wherein the groove structure is a negative space that is formed into the mechanical structure formed by the mounting structure;
wherein the groove structure is geometrically similar to the tongue structure of the handle notch;
wherein the tongue structure inserts into the groove structure with a tight fit;
wherein the tongue structure inserts into the groove structure to form the tongue and groove system;
wherein the second magnet is a magnet that mounts in the mounting structure of the grip structure;
wherein the second magnet forms a portion of the magnetic structure that aligns the tongue and groove structure that secures the handle structure to any individual pan structure selected from the plurality of cooking pans;
wherein the second magnet is magnetically attracted to the first magnet;
wherein the first magnet and the second magnet are mounted on the handle notch and the mounting structure respectively such that the first magnet and the second magnet hold the tongue structure and the groove structure in a proper alignment when the handle structure attaches to the selected individual pan structure.

9. The nestable cookware kit with detachable handle according to claim 8
wherein the accessory kit comprises a collection of accessories that are used with the nestable cookware kit with detachable handle;
wherein the accessory kit further comprises a lid and a strainer;
wherein the lid encloses the open face of any individual pan structure selected from the plurality of cooking pans;
wherein the strainer encloses the open face of any individual pan structure selected from the plurality of cooking pans;
wherein the lid is a disk shaped structure;
wherein the lid is geometrically similar to the open face of the prism structure of any individual pan structure selected from the plurality of cooking pans;
wherein the lid is a solid structure;
wherein the lid encloses the open face of the prism structure of any selected individual pan structure;
wherein the lid forms an insulating structure that contains heat within the covered individual pan structure;
wherein the strainer is a disk shaped structure;
wherein the strainer is geometrically similar to the open face of the prism structure of any individual pan structure selected from the plurality of cooking pans;
wherein the strainer is a mesh structure;
wherein the strainer encloses the open face of the prism structure of any selected individual pan structure;
wherein the strainer forms a filter that separates the food stuff contained within the selected individual pan structure and any fluids that have accumulated within the selected individual pan structure.

* * * * *